United States Patent [19]

Chng et al.

[11] Patent Number: 5,435,003
[45] Date of Patent: Jul. 18, 1995

[54] RESTORATION IN COMMUNICATIONS NETWORKS

[75] Inventors: Raymond S. K. Chng, Colchester; Christopher P. Botham, Suffolk; Mark C. Sinclair, Essex, all of England

[73] Assignee: British Telecommunications public limited company, London, England

[21] Appl. No.: 222,276

[22] Filed: Apr. 4, 1994

[30] Foreign Application Priority Data

Oct. 7, 1993 [GB] United Kingdom ............... 9320641
Feb. 14, 1994 [GB] United Kingdom ............... 9402803

[51] Int. Cl.$^6$ .............................................. G06F 11/00
[52] U.S. Cl. .................................... 395/575; 395/325; 364/229.4
[58] Field of Search .................. 395/575, 200, 325; 371/11.2, 20.1; 364/222.2, 229.4, 240.9, 265.1, 267.8, 940.64

[56] References Cited

U.S. PATENT DOCUMENTS 5,337,320  8/1994  Kung ................................. 395/575

*Primary Examiner*—Vincent P. Canney
*Attorney, Agent, or Firm*—Nixon & Vanderhye

[57] ABSTRACT

Restoration of connections by a distributed restoration process in a fully or partly meshed communications network of nodes, the restoration method comprising the steps of responding at a first end node of a path in the network to receipt of an indication that the path has failed to retrieve the identity of one or more nodes stored in the first end node in association with the identity of the path and constituting a stored restoration path for the path, sending a connection signature to the node at the other end of the path via the stored restoration path, responding at the other end node to receipt of a connection signature to send a confirmation signature to confirm establishment of the stored restoration path, broadcasting from the first end node in response to the receipt of the indication a path-finder signature to find a restoration path for the failed path by real-time restoration process, sending from the other node a real-time restoration path confirmation signature identifying a real-time restoration path selected by the other end node from one or more received path-finder signatures, and in the first end node switching traffic data for the other end node from the failed path to either the stored restoration path or the selected real-time restoration path, depending upon which confirmation signature is first received at the node.

7 Claims, 7 Drawing Sheets

FIG. 6

| RESTORATION METHOD | RESTORATION TYPE | PATH LENGTH INCREMENT | RESTORATION TIME FOR DIFFERENT ORIGINAL PATH LENGTHS IN SECONDS | | |
|---|---|---|---|---|---|
| | | | PATH LENGTH=4 | PATH LENGTH=5 | PATH LENGTH=6 |
| REAL-TIME | LINK | +1 | 0.17 | 0.17 | 0.17 |
| | | +2 | 0.25 | 0.25 | 0.25 |
| | PATH | +0 | 0.35 | 0.43 | 0.50 |
| | | +1 | 0.42 | 0.47 | 0.56 |
| PRE-PLANNED | LINK | +1 | 0.07 | 0.07 | 0.07 |
| | | +2 | 0.12 | 0.12 | 0.12 |
| | PATH | +0 | 0.10 | 0.12 | 0.12 |
| | | +1 | 0.12 | 0.15 | 0.17 |

RESTORATION IN COMMUNICATIONS NETWORKS

BACKGROUND OF THE INVENTION

1. Field of the Invention

This invention relates to the establishment of restoration paths in a communications network in which each of the nodes is arranged to operate autonomously a distributed restoration process, and also to networks having nodes arranged to operate the method of the present invention.

2. Description of Related Art

It is known, for example from the article "The Self-Healing Network: A Fast Distributed Restoration Technique For Network Using Digital Cross-Connect Machines", W. D. Grover, IEEE Globecom 87, to respond to an alarm indicating failure at a detecting node to initiate a realtime restoration process employing a simple flooding method to propagate restoration signatures (messages), and establishing connection on receipt of a return signature.

It is also known, for example from the article "Using Distributed Topology Update and Pre-planned Configurations to Achieve Trunk Network Survivability", B. A. Coan, W. E. Leland, M. P. Vecchi, A. Wainrib, L. T. Wu, IEEE Transactions on Reliability, Vol. 40, No. 4, October 1991, to restore a network using pre-planned configurations to cover specific failures. The method disclosed in this article is known as NETSPAR. The advantage of using pre-planned restoration is that once the failure has been identified the appropriate reconfiguration can be attempted immediately. In NETSPAR each node communicates with a central Network Management Centre (NMC) which is arranged to compute pre-planned restoration configurations for selected notional failures in the network. The pre-planned restoration details are held in the NMC which responds to the reporting of an alarm by a node to refer to the stored set of pre-planned restoration configurations and to send restoration instructions to all the nodes comprising a restoration configuration. NETSPAR has the disadvantages that if the failure is not covered in the stored restoration set the NMC selects the "nearest fit" configuration from the stored set, and also that the downloading of details to the nodes can be a time-consuming and complicated matter.

SUMMARY OF THE INVENTION

According to a first aspect of the present invention there is provided a method of restoring connections in a fully or partly meshed communications network of nodes each being adapted to perform distributed restoration, the method being characterised by the steps of responding at a first end node of a path in the network to receipt of an indication that the path has failed to retrieve the identity of one or more nodes stored in the first end node in association with the identity of the path and constituting a stored restoration path for the path, sending a connection signature to the node at the other end of the path via the stored restoration path, responding at the other end node to receipt of a connection signature to send a confirmation signature to confirm establishment of the stored restoration path, broadcasting from the first end node a path-finder signature to find a restoration path for the failed path by real-time restoration process, sending from the other node a real-time restoration path confirmation signature identifying a real-time restoration path selected by the other end node from one or more received path-finder signatures, and in the first end node switching traffic data for the other end node from the failed path to either the stored restoration path or the selected real-time restoration path, depending upon which confirmation signature is first received at the node.

Preferably, the real-time restoration process is initiated in response to receipt of the indication.

Methods in accordance with the present invention preferably include, in the event that the traffic data is sent via the stored restoration path, the steps of determining whether a real-time restoration path for which a confirmation signature is received is preferred to the stored restoration path and, if so, establishing the real-time restoration path, switching the traffic data from the stored restoration path onto the real-time restoration path, and dismantling the stored restoration path.*

According to a second aspect of the present invention there is provided a communications network comprising a plurality of nodes connected in a fully or partly meshed arrangement, each node being adapted to perform distributed restoration and comprising: storage means; means responsive, in use, to receipt of an alarm indicating failure of an existing path for which the node is an end node to retrieve from the storage means the identity of at least one node stored in association with the identity of the existing path and constituting a stored restoration path for the existing path, and to generate a stored restoration path connection signature including the identity of said at least one node of the stored restoration path for transmission to the node at the other end of the existing path via the stored restoration path; means responsive to receipt of a stored restoration path connection signature identifying the node as end node to generate a stored restoration path confirmation signature for return via the node or nodes identified by the received connection signature; switching means to switch traffic data from the failed existing path to the stored restoration path; means to generate a path-finder signature including the identities of the existing path and the other end node of that path for transmission to neighbouring nodes, and to forward to neighbouring nodes any received path-finder signature not identifying the node as end node; means to select from one or more received path-finder signatures identifying the node as end node a real-time restoration path and to generate a real-time restoration path confirmation signature for return via the selected real-time restoration path; and means responsive to receipt of a real-time restoration path confirmation signature from the other end node in the absence of a receipt of a stored restoration path confirmation signature to switch traffic data from the failed path to the real-time restoration path indicated by the received confirmation signature, and not responsive to receipt of any real-time restoration path confirmation signature received subsequently to receipt of a stored restoration path confirmation signature.

Preferably, the means for generating a path-finder 10 signature generates the signature in response to the alarm.

Preferably there is included means responsive to receipt of respective path confirmation signatures for both the stored restoration path and a real-time restoration path to determine whether the real-time restoration path is preferred to the stored restoration path and, if so, to establish the real-time restoration path, to switch the traffic data from the stored restoration path onto the real-time restoration path, and to dismantle the stored restoration path.

Preferably the switching means is responsive to receipt of the alarm to switch the traffic data to the stored restoration path following the transmission of the stored restoration path connection signature.

Because there is some variation in the meanings of terms used in the art, the following terms as used in this application will now be defined. A node is a cross-connect switch (CCS) or an add/drop multiplexer (ADM). A link is a block of bidirectional traffic capacity, e.g. a single line system or bearer, and corresponding to the switching granularity of the CCSs and ADMs. A span is the set of all links which directly connect a pair or nodes, i.e. there being no intermediate nodes. A subspan is a subset of all links which directly connect a pair of nodes, and a link can appear in only one subspan. A path is an end-to-end combination of links through the network. A worker is a link which is carrying traffic. A spare is a link which does not normally carry traffic and can be used for restoration in the event of a worker failing. A spare is also known as a protection link.

BRIEF DESCRIPTION OF THE DRAWINGS

Specific embodiments of the invention will now be described by way of example with reference to the drawings, in which:

FIG. 6 shows a table of restoration times; and

Figure 1:
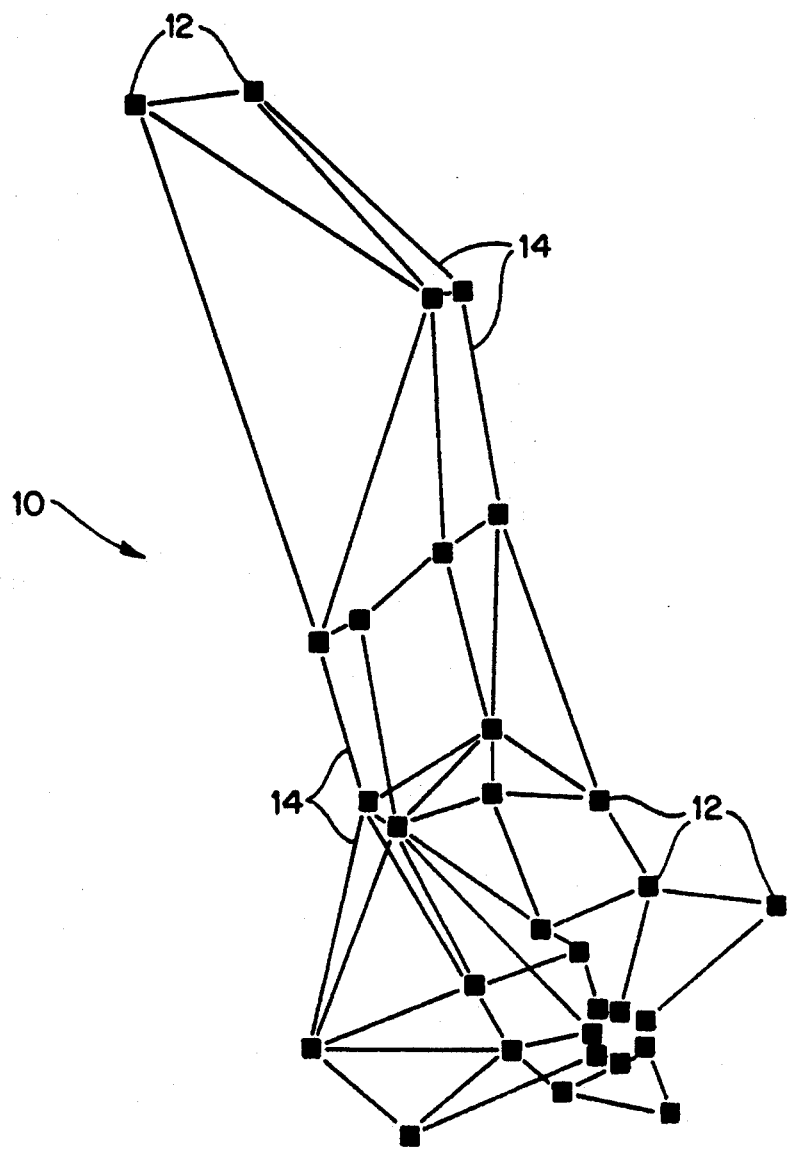
FIG. 1 is a diagram of a network of interconnected nodes.

A network 10 is shown in FIG. 1 comprising thirty nodes 12, each of which is a high-speed Digital Cross-connect System, interconnected by a total of fifty seven spans 14. Each node 12 is programmed to perform a restoration sequence or process comprising a number of components.

Figure 3:
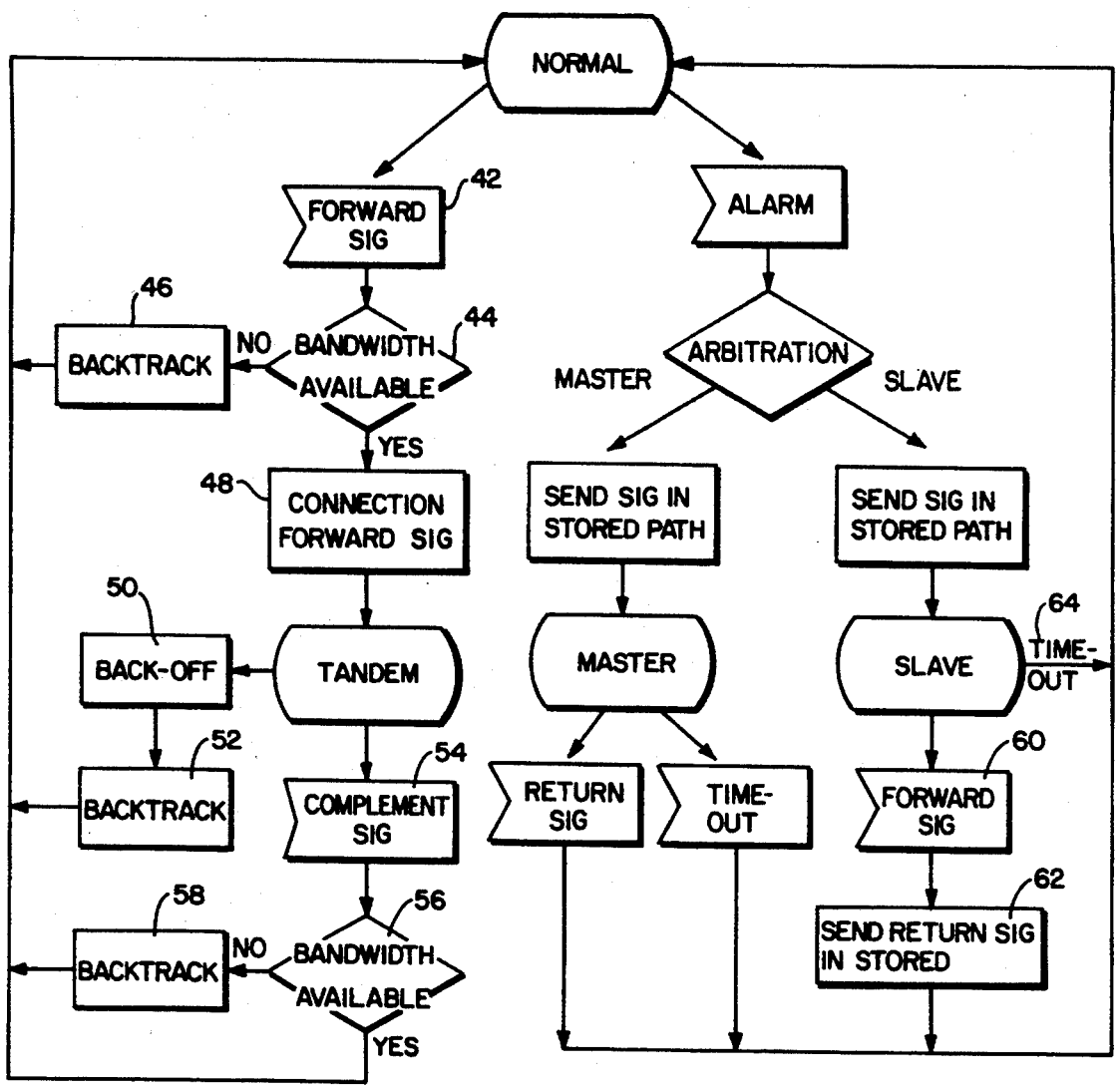
FIG. 3 shows a connection finite state machine of the present invention.

A first component is a connection finite state machine (FSM) which is defined in Specification Description Language (SDL) notation as shown in FIG. 3. A second component is a path-tracer FSM defined in SDL notation and shown in FIG. 4, and a third component is a path-finder FSM defined in SDL notation and shown in FIG. 5.

In the network 10 each node 12 has a unique identity (ID), and paths between pairs of nodes (end nodes) can be identified by the ID's of the end nodes together with an additional unique ID, thus making it possible to distinguish any path in the network. However, not all of the theoretically possible paths will be designated as operational paths by network planners. Each such designated path will be assigned a different priority so that in the event of multiple failures in the network, spare capacity can be allocated on a priority basis.

Figure 2:
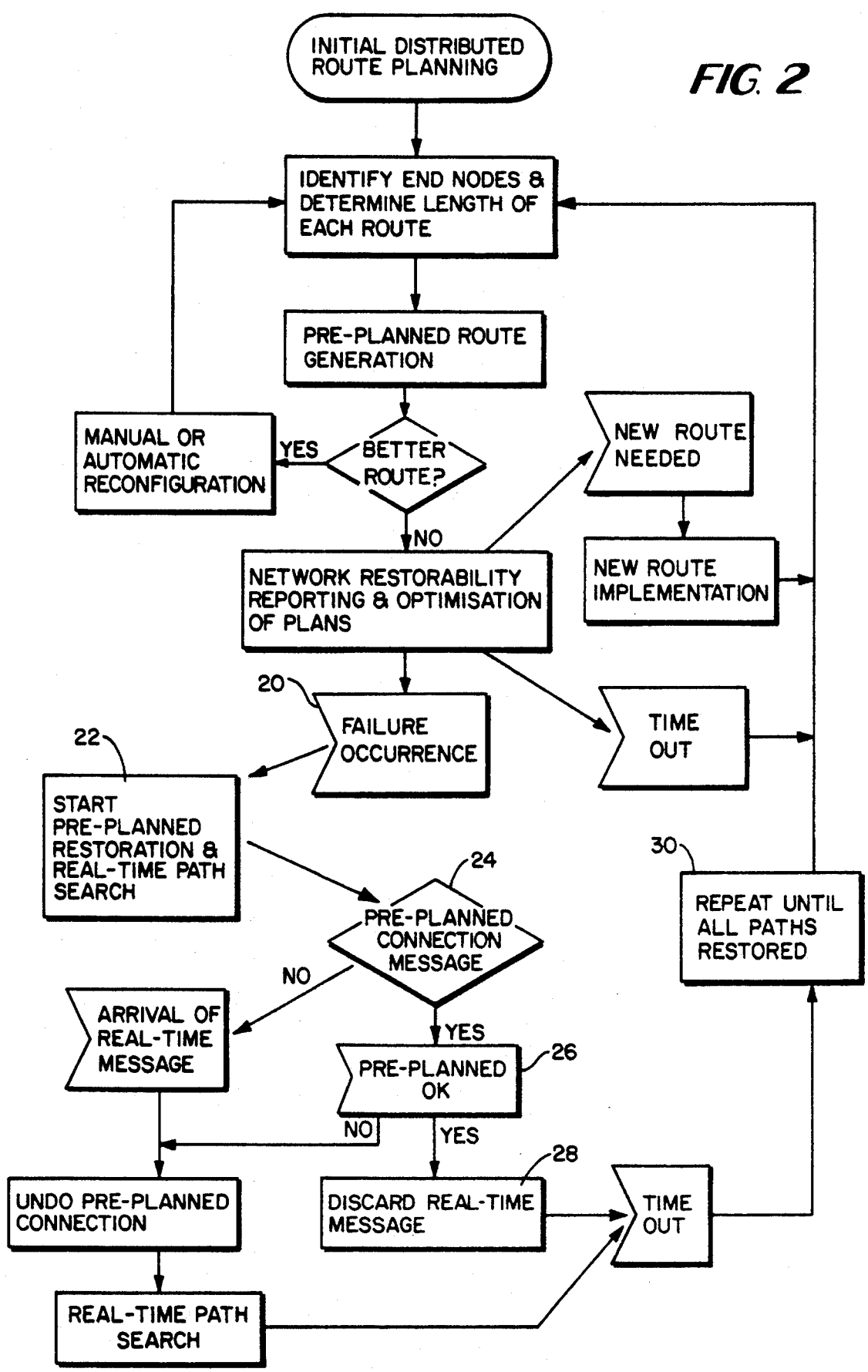
FIG. 2 shows the flow chart of a restoration sequence of thee present invention.

Each node 12 operates the path-finder FSM in a background mode in order to determine periodically the optimum restoration route to another node in the event of a route failure, and to store information on the pre-planned restoration route. As is described in detail later in connection with the path-finder FSM, originating and terminating nodes of a path use the path-finder FSM to obtain a set of optimum pre-planned restoration paths, and tandem nodes use it to find a set of optimum pre-planned bypass routes for failed spans. All the FSM's will be described in detail later, but it is, however, convenient at this point to describe the action that nodes take upon detecting a failure, with reference to FIG. 2.

When a span failure is detected (20), the two directly connected (tandem) nodes will arbitrate their roles, each node knowing its own ID and the ID of the other node, on the basis that the node having the higher ID will act as the master and the other node will act as the slave. Respective connection signatures (also known as requests or messages), as described later in greater detail with reference to the connection FSM, will be made from both the master and the slave based on the pre-planned bypass restoration information stored therein (22). A full connection is established when a bypass node which has received a connection signature from the master also receives the corresponding signature from the slave. The bypass node marks the connection as confirmed, i.e. protected from being backed off by a restoration attempt for a path having a higher priority, and terminates the connection signature from the slave. The bypass node will have already forwarded the connection signature from the master to the slave via any further bypass nodes of the bypass route. The slave responds to receipt of the connection signature from the master by sending a return connection signature to the master to confirm the path. Both nodes do not wait for receipt of a signature (a connection signature at the slave, and a return signature at the master) before sending traffic data via the bypass node. This connection process is thus faster than methods known as "two-phase" restoration in which the master waits for receipt of a confirmation message from the slave before it sends traffic data.

If a bypass node is not able to make a connection (because bandwidth which was available when the pre-planned bypass route was selected is no longer available, or because there has been no receipt of the return request before the time-out), it sends a backtrack signature (message) to the master and the slave which causes them to broadcast help messages to their respective end nodes. As these help messages flood through the network they break down connections along the failed path. When an end node receives a help message, it knows the ID of the path which has failed and can then initiate pre-planned path restoration for that path.

The master and slave tandem nodes determine from stored information whether using a bypass route would result in an end-to-end path not longer than the pre-planned restoration path and in that event will mark the bypass route as permitted. If there is no permitted bypass route, the nodes will immediately notify the end nodes with the help messages.

Figure 5:
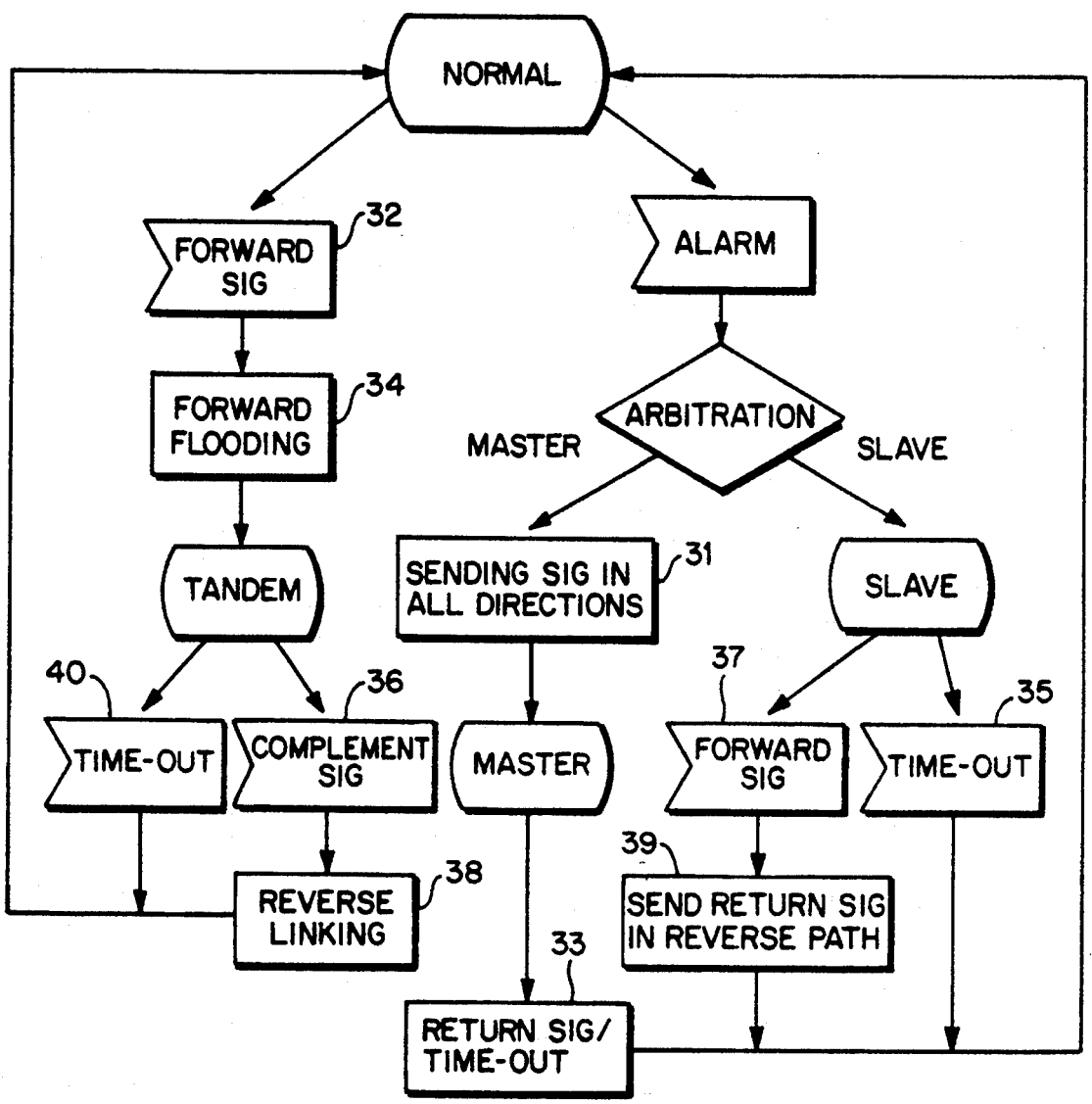
FIG. 5 shows a path-finder finite state machine of the present invention.

The end nodes will attempt restoration via the pre-planned restoration path and simultaneously initiate real-time restoration (22) in accordance with the path-finder FSM (FIG. 5). If a connection is made over the pre-planned restoration path (24,26), the tandem node at which a connection signature from the slave "meets" one from the master will discard all real-time path-finder signatures corresponding to that path ID. On receipt of the return signature from the slave, the master treats the real-time restoration process as terminated (28). Where an end node is master for a plurality of paths affected by the failure, the restoration processes proceed in parallel. The respective pre-planned connection signatures and real-time psth-finder signatures are transmitted substantially simultaneously in response to receipt of the help message.

As can be seen in FIG. 6, the times for achieving restoration using pre-planned restoration are shorter than for real-time restoration. This is chiefly due to the extra processing that each node has to perform with real-time restoration. Thus, if the pre-planned path is still available, restoration can be achieved in a very short time. However, even if the pre-planned path is not available, the longest restoration times are of the order of half a second which is significantly shorter than the holding time of various items of telecommunications equipment, and thus existing calls will not be closed down by the network.

Turning now to the operation of the background path-finder FSM as shown in FIG. 5, a master node sends (i.e. broadcasts) a forward path-finder signature or message on all its outgoing spans, other than the span associated with the path for which restoration is to be provided. Each node has a list of the span lengths from each of its neighbouring nodes, and on receipt of a forward signature (32) updates an accumulated path length field in the forward signature by adding the value of the span length from the node from which it received the forward signature. In an alternative arrangement, the node creates an additional subfield containing the respective value of span length, and the slave node performs addition of all the subfields to obtain the value of the restoration path length.

The path-finder signature also contains a hop count field, and the FSM provides that each node receiving a path-finder signature examines the hop count field and terminates any signature whose accumulated hop count exceeds a predetermined limit in order to limit the extent of the flooding of the forward path-finder signatures. For each signature which is not terminated, a node will increment the hop count value and then broadcast (34) the modified signature on all its outgoing spans. In variants, the node additionally or alternatively examines the accumulated path length field and terminates any signature whose accumulated path length exceeds a predetermined limit, and in this case the accumulated path length field is updated in advance by adding the span length of the span on which the signature is sent, as opposed to updating in arrears by the span length of the span on which the signature is received.

The forward signature reserves spare capacity according to a priority field in the forward signature which was set by the master node in accordance with the priority of the path for which restoration is being attempted. Thus a low priority reservation can be overwritten by a higher priority reservation. Ultimately, the slave receives a number of forward signatures and for each it will update the accumulated path length and then store the signature.

Upon a time-out the slave will select the forward signature having the lowest value of overall path length, and convert the forward signature into a reverse signature, sending it back to the neighbouring node from which it was received. The reverse signature will travel back (36) through the intermediate nodes, each of which in turn will append (38) its node ID so that when the master receives the reverse signature it will be in possession of all the information needed about the pre-planned restoration path, namely, the length of the path and the identities of all the nodes on that path. The master then sends a pathtracer signature to the slave via the intermediate nodes on the original path to inform each of these intermediate nodes of the restoration path length (each node storing this in association with the path ID), and to inform the slave of the intermediate nodes of the restoration path (the slave storing the intermediate node ID's in association with the path ID).

The slave may also select one or more further signatures and send reverse signatures for these, whereby the master (and the slave) will store a set of "optimum" restoration paths (second best, third best, etc.).

Suppose that there is a span failure between two nodes on a multispan path. The node having the higher ID will be referred to as the "span master", and the node having the lower ID will be referred to as the "span slave". The span master has stored within it a list of the path ID's currently being handled by the worker links of that span, together with corresponding restoration path lengths. The span master now selects one of the path ID's and attempts to restore a path for it on the basis of the information which it holds, namely :- the path ID, the path length, the restoration path length, the span length to the span slave, and the path length to the span slave via a bypass node. In background mode, the span master will have determined, for the selected path ID, whether restoration of the original path via any of the optimum bypass routes, selected by the slave node in background, will produce a path length less than the restoration path length, and if so, will mark such bypass routes as permitted, and will instruct the slave node to store the same information. On the occurrence of the failure, the span master will check to see whether there are respective permitted bypass routes stored in association with the worker links of the failed span, which themselves are associated with path ID's, and, if there is a permitted bypass route, will immediately proceed to send a connection signature to the bypass node. Simultaneously, the span slave will also perform the same check and arrive at the same decision to attempt connection via the bypass route.

For each worker link in the failed span for which there is no pre-planned bypass route marked as permitted, the two nodes will independently and simultaneously send a 10 help message to the respective end node corresponding to the failed worker to take down the existing connections and instruct the respective end node to initiate a pre-planned path restoration. Each end node refers to its database and accesses the stored information on the basis of the path ID, and each simultaneously determines whether it is the master or slave and proceeds to send connection signatures to the nodes stored in connection with the associated restoration path. As mentioned, the master simultaneously initiates real-time path search using the path-finder FSM.

The path-finder FSM shown in FIG. 5 is responsible for locating any available routes between two given nodes. Only nodes that have end-to-end routes (paths) which originate or terminate at them are required to initiate or respond to a full path-finder operation based on the path ID for which a restoration path is required. Other nodes act as tandem nodes, monitoring received signatures and updating the hop count and accumulated span length fields before sending on the modified signatures. However, as mentioned, tandem nodes periodically perform a limited background "path-finder" operation to find the optimum pre-planned bypass routes to each neighbouring node of lower ID for possible use in the event of a failure of one its spans.

A node which originates or terminates a path will know the ID of the node at the other end of that path, and can determine whether it is the master or the slave for each respective path ID. Where it is the master, it periodically performs background path-finding by broadcasting a path-finder signature containing the master ID, the slave ID, the path ID, the path priority level, and the required bandwidth.

Each node on receiving a forward signature (32) responds by determining whether it is the end node for that path, or whether it is a tandem node and should forward flood the signature (34), however such a determination step is not shown in FIG. 5 as it considered as part of the general behaviour of a node to check whether a received message contains that node's ID as the destination ID.

If the former, then the node updates the accumulated span length field and stores the signature in association with the ID of the node from which it was received and starts a timer. After the time out, the node selects the stored signature having the lowest value of accumulated span length and converts it into a return signature by interchanging the originating and terminating ID's and inserting a "return signature" code into a Signature Type field. The node then sends the return signature to the node from which it was received and assumes its normal state. As mentioned, one or more "next best" selections may be made and processed in the same manner.

If the latter, then the node sets a timer (40), examines the priority field in the signature, and, if it does not need to give way to a higher priority signature, checks whether it should terminate the signature because of its hop count (or path length). If it can proceed, it increments the hop count field, adds the span length of the incoming (or outgoing) span to the value in the accumulated span length field, forward floods the modified signature (34), and reserves the requested spare capacity in association with the path ID, the incoming span (or node ID), and the priority level.

At a tandem node which has forward flooded a signature, either the time out matures (40) and the node cancels the reservation for the spare bandwidth, or the node receives a return signature (36) from the end node, in response to which it appends its ID to the return signature (38) and sends it on the span reserved in association with the path ID.

The right-hand side of FIG. 5 shows the real-time operation of the path-finder FSM in the event of an alarm. On receipt of an alarm a node checks which path ID's are affected and determines for each whether it is master or slave. For each path in turn, ranked by path priority and for which it is master, it will find in real-time the optimum restoration path. As master it sends a forward signature (31) on each span having a spare link (the signature being sent on a spare link), sets a timer and awaits a return signature (33). As slave it sets a timer (35) and awaits a forward signature (37), on receipt of which it processes it, and any other forward signatures for the same path ID, as described above for background path-finder operation, and sends a return signature (39) back via the node from which the selected forward signature was received. In alternative arrangements master and slave perform bi-directional real-time restoration.

The connection FSM shown in FIG. 3 defines the operation of a node in response to receipt of a forward connection signature (left-hand side) and in response to receipt of an alarm (right-hand side). A tandem node, on receiving a forward signature (42), checks whether there is sufficient bandwidth available (44) to meet the requested bandwidth. If not, then it sends a backtrack message (46) to the neighbouring node from which the forward signature was received to forward to the master. This backtrack message dismantles (cancels) the reserved connections already made in preceding intermediate nodes. If there is, it makes a reservation for the requested bandwidth and forwards the connection signature (48) to the next node contained in the signature. If the node receives a higher priority connection signature before the connection has been completed, the higher priority signature will initiate a back-off procedure (50) to cancel the lower priority connection attempt and send a backtrack message (52) as before.

It will be appreciated that when a slave responds to an alarm to attempt restoration via its pre-planned path, the connection signature sent is referred to as a forward signature, even though its direction is from slave to master, because it is performing the same function as a connection signature travelling in the opposite direction.

At a tandem node which has received a forward signature from one direction and subsequently receives the complementary connection signature (54), i.e. a connection signature for the same restoration path but travelling in the opposite direction, the reserved bandwidth is checked (56) and if still available now confirmed so that no higher priority connection signature can force a back-off. If the required bandwidth is not available a backtrack message (58) is sent in the direction from which the complementary signature was received, a backtrack message will have already been sent in the opposite direction upon receipt of the higher priority signature. The slave responds to receipt of the forward signature (60) by sending a return signature (62) to the master to confirm that connection has been made through all the intermediate nodes. If no forward signature is received within a time-out (64), the slave returns to normal state and awaits receipt of real-time signatures.

In alternative arrangements, instead of discarding real-time path-finder signatures received at the slave after a return connection signature has been sent to confirm the stored restoration path, the slave proceeds to select the optimum real-time restoration path in the usual manner and compares the path length with that of the stored restoration path. If the real-time restoration path is the preferred path, the slave sends a message to the master and the two nodes start a procedure to switch traffic from the stored restoration path to the real-time path and dismantle the stored restoration path.

When a master sends traffic data immediately following the connection signature, it sets a timer. If no return signature is received by the time-out, the master will assume that the path is not available, abandon the attempt via a pre-planned path and await the result of the simultaneous real-time path-finder process.

Figure 4:
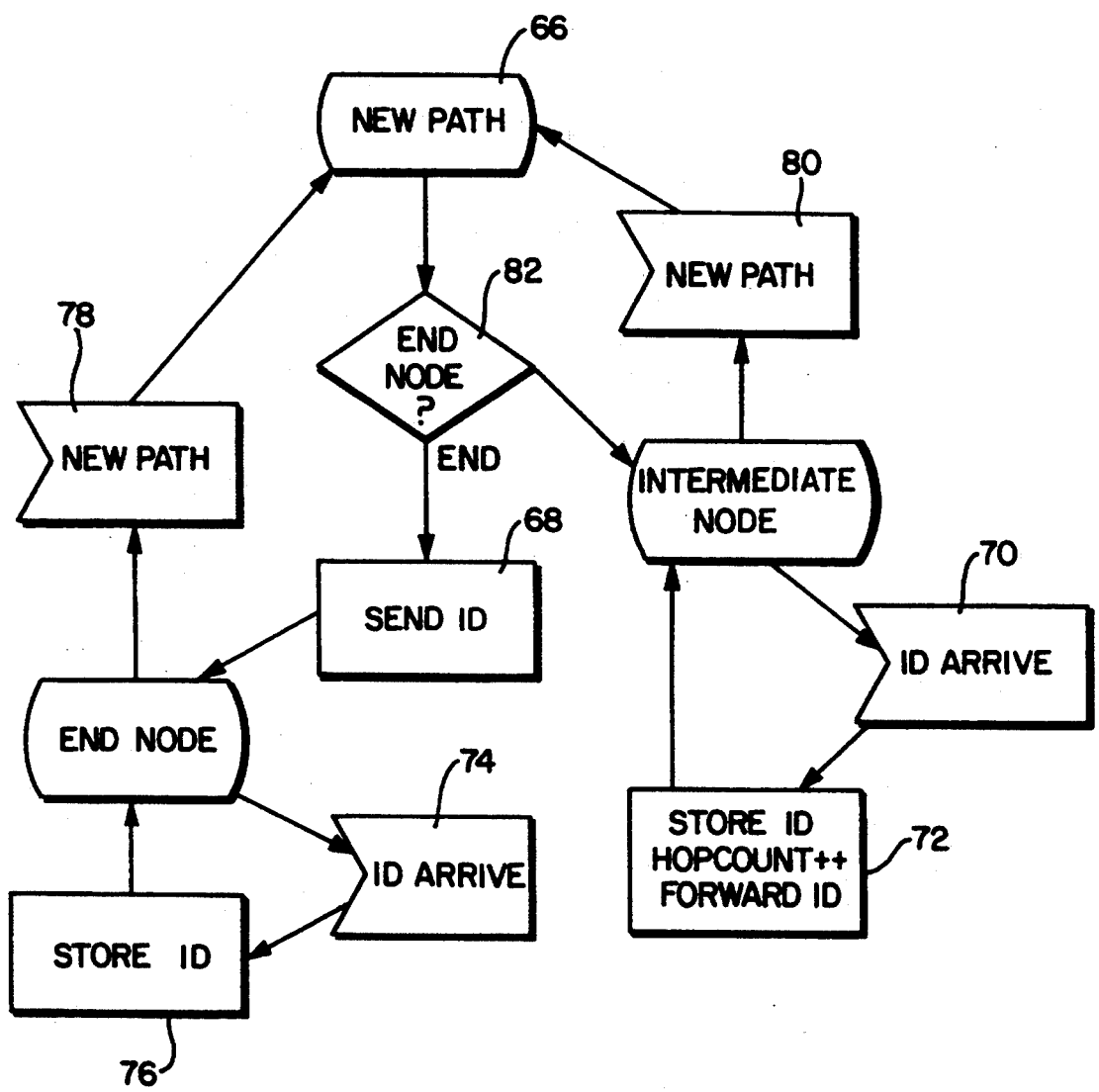
FIG. 4 shows a path-tracer finite state machine of the present invention.

The path-tracer FSM is invoked by any end node which determines that it has insufficient information on paths for which it is the master. This may be as part of the background path-finder operation described above, or when a new restoration process is applied to a working network and the existing paths must be found. The essential parts of the path-tracer FSM are shown in FIG. 4.

A master end node deciding (66) that a path needs to be traced will send a path-tracer signature (68) for each path ID for which it needs routing information. As a signature passes through the intermediate nodes (70) along the path, each intermediate node stores the path ID and the end node ID's. The intermediate node increments a hop count field in the signature, appends its node ID to the signature and forwards the modified signature (72) to the next node associated with the path ID. The intermediate node also stores for each path ID the number of hops from the end nodes. This is so that an intermediate node can define the maximum hop count of a generated help message and thus control the flooding wave.

When a node receives a path-tracer signature it first checks whether it is the end node for that signature (82), and whether the received signature is in respect of a new path (78,80) not yet recorded in the node. When a slave end node receives a forwarded path-tracer signature (74) relating to a new path (74,78), it stores the ID's of the intermediate nodes of the path (76) and, as an end node, sends a return signature (78,66,82,68) to the master node so that it too can store the ID's (76) of the intermediate nodes of that path.

As mentioned above, but not shown specifically in FIG. 4, a path-tracer signature contains path length information which is read and stored by each intermediate node that the signature passes through.

In the event of a failure of an intermediate node, a neighbouring node having a higher ID might have a permitted bypass node for what it sees as a span failure. When the forward connection signature reaches that first bypass node there will be no capacity to the failed node, and the first bypass node will attempt to forward the connection signature to the failed node via a second bypass node. Eventually, the forward connection signature will arrive at the other intermediate node connected to the failed node and associated with the same path ID. If this other intermediate node also had a higher ID than the failed node, it too will have sent a forward connection signature, not necessarily via the same bypass nodes. If two possible non-identical connections thus result, the restoration process will choose one and dismantle the other. In alternative arrangements the master and the slave, knowing the number of hops to the slave via the bypass route (say n), will set a lesser limit (say n−1) to the number of hops traversed by the connection signature, thereby preventing the establishment of non-identical connections.

Each node 12 in the network 10 is connected to a Network Management Centre (NMC), and will report to the NMC any circumstances where its background path-finder mode fails to find a restoration path or route for a notionally-failed path or span in the network. The NMC will respond by re-routing one or more paths away from the congested areas thus releasing capacity for use as restoration paths.

As mentioned, the background path-finder process is continually run on a periodic basis at the nodes, and it therefore used to provide post-restoration optimisation. In other words, where a pre-planned restoration path has been activated successfully, that path may not at that time be the optimum path length between the two end nodes. The background path-finding process next run by the master end node will determine the optimum path to the slave end node, and either the pre-planned restoration path will be confirmed or the end nodes will perform a seamless change from the pre-planned restoration path to the newly-found optimum path.

Figure 7:
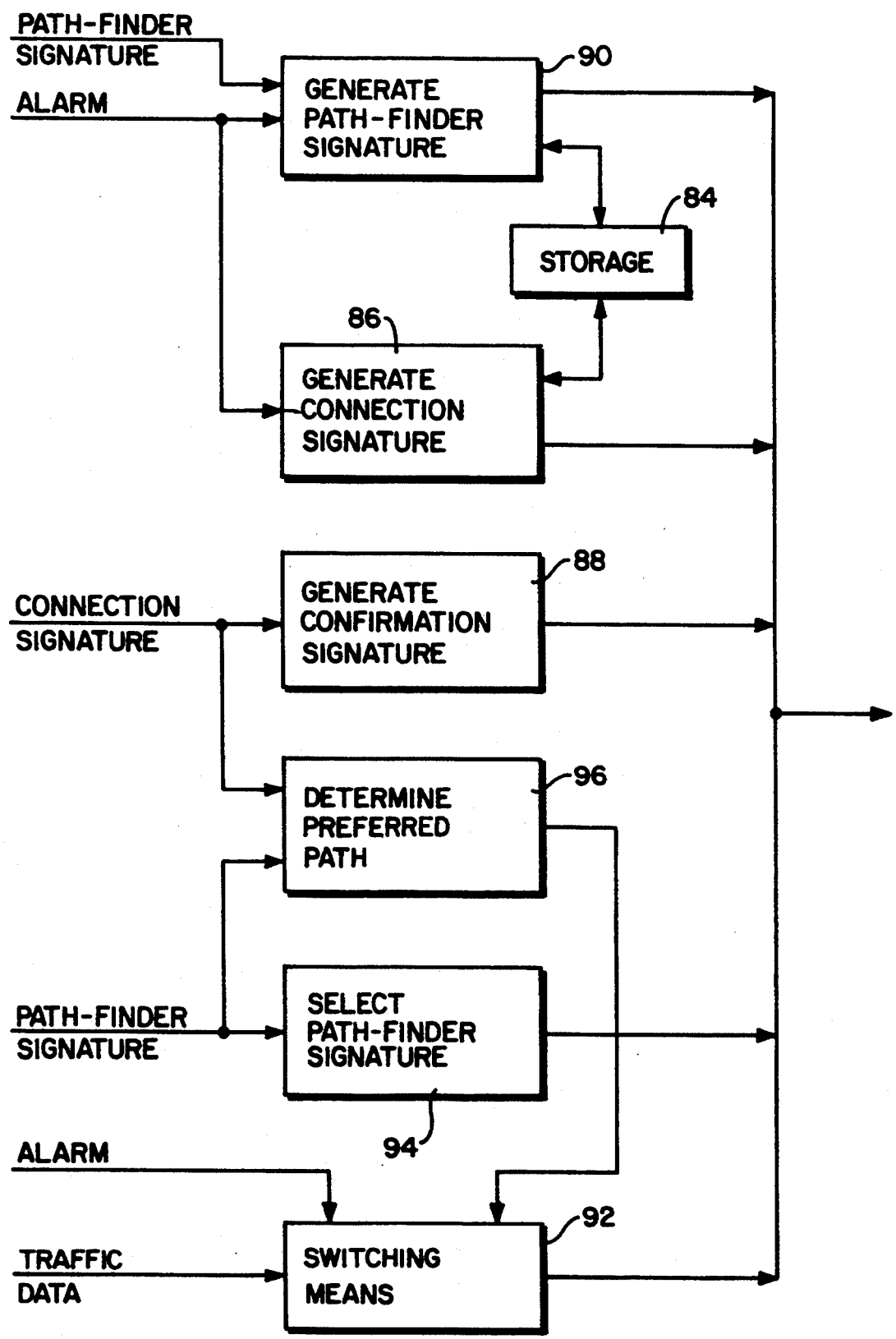
FIG. 7 shows a block schematic diagram of the main components of a node of a network of the present invention.

As shown in FIG. 7, a node 12 can be depicted as comprising a number of operational blocks which although they may be constructed as special purpose hardware items are preferably embodied by means of a computer program controlling the processor of the node 12.

In FIG. 7, there is shown a storage means 84 for storing details of the respective existing paths associated with the node, including whether the node is an end node for a path or an intermediate node, the identity of the respective neighbouring nodes to which signatures and traffic data are forwarded, and the identity of each node of the respective restoration paths for the existing paths, these latter being referred to as stored restoration paths.

Means 86 is responsive to receipt of an alarm indicating failure of an existing path for which the node is an end node to retrieve from the storage 84 the identity of the node or nodes constituting the stored restoration path for the failed existing path to generate a stored restoration path connection signature including the identity of the end node and all the intermediate nodes for transmission to the other end node via the stored restoration path.

A generating means 88 is responsive to receipt of a stored restoration path connection signature identifying the node as end node for the restoration path to generate a stored restoration path confirmation signature for return via the restoration path identified by the received connection signature.

A generator means 90 is arranged to generate a path-finder signature including the identities of the existing path and the other end node of that path for transmission to neighbouring nodes (broadcast) in response to receipt of the alarm, and is also arranged to forward to neighbouring nodes any received path-finder signatures which do not identify the node as end node. In alternative arrangements the generating means 90 generates the path-finder signature in response to the failure of the establishment of the stored restoration path indicated by a confirmation signature not being received at the node within the time out for receipt of the confirmation signature.

A switching means 92 is arranged to switch traffic data from the failed existing path to the stored restoration path in response to receipt of the alarm, the traffic data being transmitted immediately following the restoration path connection signature. In other arrangements, the switching means awaits receipt of the confirmation signature before transmitting the traffic data.

Real-time path-finder signatures received by the node as end node are processed by a selection means 94 to select a signature in accordance with the shortest path length as described above, and to generate a real-time restoration path confirmation signature for return via the selected real-time restoration path. A determination means 96 is responsive to receipt of confirmation signatures for both the stored restoration path and a real-time restoration path to determine whether the real-time restoration path is preferred to the stored restoration path, and in the event that the real-time path is preferred, the determination means 96 will send a connection signature to establish the real-time restoration path, switch the traffic data from the stored restoration path onto the real-time restoration path, and dismantle the stored restoration path by an appropriate signature.

We claim:

1. A method of restoring connections in a fully or partly meshed communications network of nodes each being adapted to perform distributed restoration, the method being characterised by the steps of responding at a first end node of a path in the network to receipt of an indication that the path has failed to retrieve the identity of one or more nodes stored in the first end node in association with the identity of the path and constituting a stored restoration path for the path, sending a connection signature to the node at the other end of the path via the stored restoration path, responding at the other end node to receipt of a connection signature to send a confirmation signature to confirm establishment of the stored restoration path, broadcasting from the first end node a path-finder signature to find a restoration path for the failed path by real-time restoration process, sending from the other node a real-time restoration path confirmation signature identifying a real-time restoration path selected by the other end node from one or more received path-finder signatures, and in the first end node switching traffic data for the other end node from the failed path to either the stored restoration path or the selected real-time restoration path, depending upon which confirmation signature is first received at the node.

2. A method as claimed in claim 1, wherein the real-time restoration process is initiated in response to receipt of the indication.

3. A method as claimed in claim 1, including, in the event that the traffic data is sent via the stored restoration path, determining whether a real-time restoration path for which a confirmation signature is received is preferred to the stored restoration path and, if so, establishing the real-time restoration path, switching the traffic data from the stored restoration path onto the real-time restoration path, and dismantling the stored restoration path.

4. A communications network comprising a plurality of nodes connected in a fully or partly meshed arrangement, each node being adapted to perform distributed restoration and comprising: storage means; means responsive, in use, to receipt of an alarm indicating failure of an existing path for which the node is an end node to retrieve from the storage means the identity of at least one node stored in association with the identity of the existing path and constituting a stored restoration path for the existing path, and to generate a stored restoration path connection signature including the identity of said at least one node of the stored restoration path for transmission to the node at the other end of the existing path via the stored restoration path; means responsive to receipt of a stored restoration path connection signature identifying the node as end node to generate a stored restoration path confirmation signature for return via the node or nodes identified by the received connection signature; switching means to switch traffic data from the failed existing path to the stored restoration path; means to generate a path-finder signature including the identities of the existing path and the other end node of that path for transmission to neighbouring nodes, and to forward to neighbouring nodes any received path-finder signature not identifying the node as end node; and means to select from one or more received path-finder signatures identifying the node as end node a real-time restoration path and to generate a real-time restoration path confirmation signature for return via the selected real-time restoration path; the switching means being responsive to receipt of a real-time restoration path confirmation signature from the other end node in the absence of a receipt of a stored restoration path confirmation signature to switch traffic data from the failed path to the real-time restoration path indicated by the received confirmation signature, and being not responsive to receipt of any real-time restoration path confirmation signature received subsequently to receipt of a stored restoration path confirmation signature.

5. A network as claimed in claim 4, wherein the means for generating a path-finder signature generates the signature in response to the alarm.

6. A network as claimed in claim 4, including means responsive to receipt of respective path confirmation signatures for both the stored restoration path and a real-time restoration path to determine whether the real-time restoration path is preferred to the stored restoration path and, if so, to establish the real-time restoration path, to switch the traffic data from the stored restoration path onto the real-time restoration path, and to dismantle the stored restoration path.

7. A network as claimed in claim 4, wherein the switching means is responsive to receipt of the alarm to switch the traffic data to the stored restoration path following the transmission of the stored restoration path connection signature.

* * * * *